United States Patent [19]

Kozłowska et al.

[11] 4,148,789

[45] Apr. 10, 1979

[54] METHOD FOR OBTAINING CONCENTRATED PROTEINS FROM THE RAPE SEEDS, AND THE SET OF EQUIPMENT FOR EMBODYING THIS METHOD

[75] Inventors: Halina Kozłowska; Ryszard Zadernowski; Bożena Chodkowska-Lossow, all of Olsztyn; Kazimierz Bogaczyński; Kazimierz Szebiotko, both of Poznań, all of Poland

[73] Assignees: Akademia Rolniczo-Techniczna, Olsztyn; Akademia Rolnicza, Poznań, both of Poland

[21] Appl. No.: 746,725

[22] Filed: Dec. 2, 1976

[30] Foreign Application Priority Data

Dec. 2, 1975 [PL] Poland ................................. 185191

[51] Int. Cl.$^2$ .............................................. A23J 1/14
[52] U.S. Cl. .................................. 260/123.5; 426/656
[58] Field of Search ......................... 260/123.5, 112 R

[56] References Cited

U.S. PATENT DOCUMENTS

| | | | |
|---|---|---|---|
| 3,392,026 | 7/1968 | Mustakas et al. | 260/123.5 X |
| 3,560,217 | 2/1971 | Youngs et al. | 260/123.5 X |
| 3,828,017 | 8/1974 | Finley et al. | 260/112 R X |

FOREIGN PATENT DOCUMENTS

| | | | |
|---|---|---|---|
| 2322462 | 11/1974 | Fed. Rep. of Germany | 260/122 |
| 2540177 | 3/1977 | Fed. Rep. of Germany | 260/123.5 |
| 377652 | 7/1975 | Sweden. | |
| 1241078 | 7/1971 | United Kingdom. | |

*Primary Examiner*—Walter C. Danison
*Attorney, Agent, or Firm*—Eric P. Schellin; Anne M. Kornbau

[57] ABSTRACT

The invention is applicable in production of the protein concentrate from the rape seeds, free of the thioglycoside-type noxious and toxic matters, and therefore suitable for food or fodder use.

The method according to this invention is characterized in that prior to the water extraction process, the rape whole seeds are purified and classified (sorted) into at least two fractions, each containing the seeds of unified size, subsequently each fraction being subject to water extraction complete with inactivation of the mirosinase enzyme, whereafter the seeds — while still in wet condition — become deprived of the seed-leaves; then, the mixture of hull and seed-leaf undergoes washing in hot water, dripping off, drying and removing of hull and the not hulled seeds, if any.

At last, the purified seed-leaves become deoiled and disintegrated using conventional methods.

6 Claims, 1 Drawing Figure

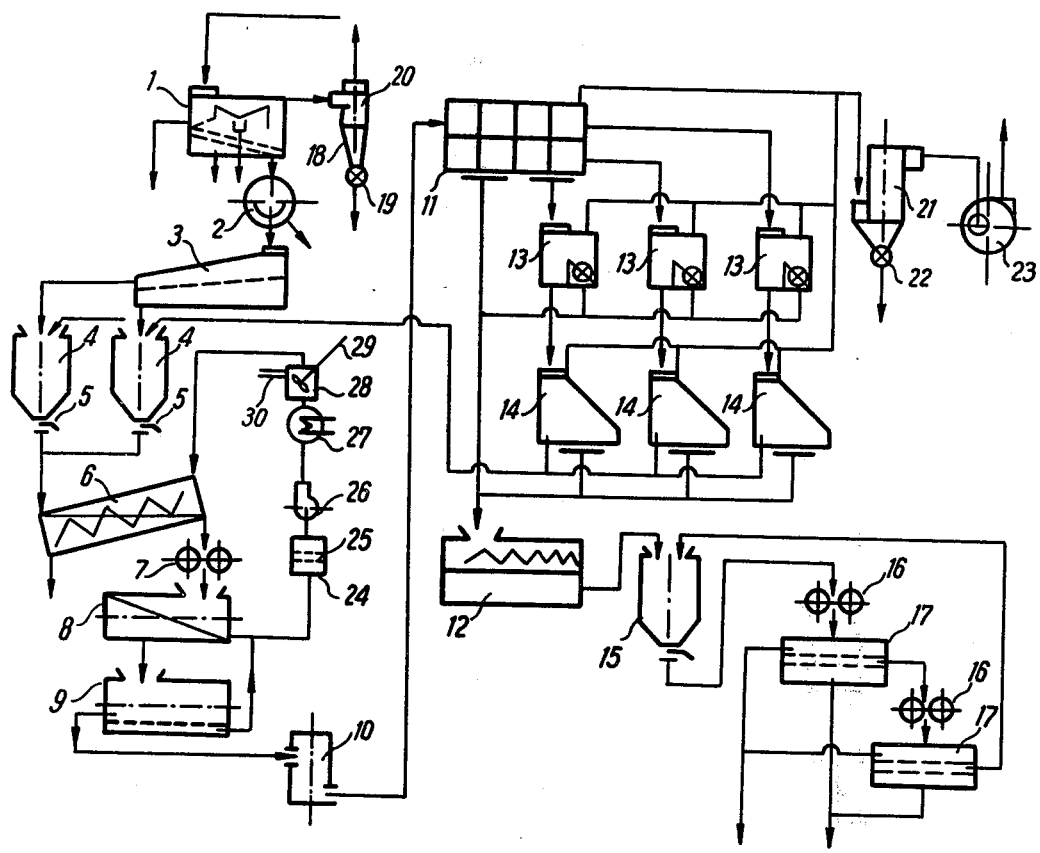

METHOD FOR OBTAINING CONCENTRATED PROTEINS FROM THE RAPE SEEDS, AND THE SET OF EQUIPMENT FOR EMBODYING THIS METHOD

This invention covers the method for obtaining the protein concentrate from the rape seeds free of the tioglycoside-like noxious or toxic compounds, and therefore suitable as food or fodder.

The invention relates also to the set of equipment for obtaining the protein concentrate from the rape seeds.

Hitherto known have been only two methods covering the whole process for obtaining of edible protein concentrate from the rape seeds, viz. that acc. to the Swedish Patent No. 377,652 named "Method for Production of Edible Rape Protein Concentrate", and the Canadian invention "Method for obtaining Protein Concentrate from the Rape Seeds" acc. to the British Patent No. 1,242,078. The Swedish patent covers also the set of equipment for using the invented method.

According to the Swedish patent, the production process covers decortication, inactivation of the mirosinase enzyme, extraction of the thioglycosides, drying and deoiling. The decortication (hulling) is effected by crushing of seeds between rotating rolls, the hull being separated from the pulp by means of sieves (in two stages). Three fractions are obtained within the frist stage: the coarse-grained cut, medium- size one and the flour. The medium-size cut will be hulled by means of fluidic equipment with stream of air let across the moving sieves. The coarse-grained fraction, containing the not crushed seeds and hull becomes placed on the gravity tables, and—upon separation of not crushed seeds—again subject to disintegration and segregation into the fractions as described above. The hulled seed fractions and flours become mixed with the cuts obtained during the foregoing process, the flour being pressed for oil extraction.

Inactivation of the microsinase enzyme will be effected with the deoiled material—the medium size cut, by keeping it in water at 80° C. to 100° C. for 1.5 to 20 minutes, most preferably during 3 to 10 minutes. This process should be carried out by means of equipment provided with the heating jacket and the worm conveyor for moving the material to washing facilities.

Extraction process will be effected in counter-current by means of multi-stage equipment, each stage being provided with the (mixer) agitator and the sieves rotating in the horizontal plane, where upon the extraction the seeds become separated from liquid. The extraction process temperature range is from 0° to 100° C., preferably within the limits of 60°–80° C., or 10°–30° C. Within each stage of equipment, during 15–90 minutes the material is washed in water of its pH-value ranging from 2 to 8, the ratio of seeds to the vater volume for each bath being 1:10. Number of successive extractions is two to eight. With the water extraction completed, the seeds become freeze dried (lyophilizated) in hot air containing 3 to 7 percent of moisture. For the seed extraction, standard extractors are used, the solvent being then removed in the vacuum petrol eliminator. The final product is the concentrate containing on average 64.5% of protein, 1.0% of fat, 7.5% of cellulose, and 0.06% of thioglycosides.

The other known method for obtaining the protein concentrate in continuous process from the rape seeds, according to the British Patent No. 1,241,078 "Method for obtaining Protein Concentrate from Rape Seeds", covers the following process stages: thermic inactivation of the mirosinase, disintegration of seeds and the water extraction thereof, drying, filtering of extracted material, extraction of fat, and separation of the protein rich fractions from the protein poor ones. For the mirosinase inactivation, the seeds will be soaked in hot water at the temperature of 85° C. during 0.5 to 5 minutes. Then, the seeds should be cooled down by sprinkling them with cold water. Subsequently, the wet seeds become disintegrated to separate the seed-leaves from the hull, this step being followed by extraction in cool or warm water to remove the thioglycoside-like toxic compounds from the seed-leaves. Within the periodic system, the extraction process temperature will be recommended up to 80° C., during 15 to 60 minutes. On dewatering, the obtained seed pulp containing also the disintegrated hull, shall be dried, subject to oil squeezing and solvent fat extraction, followed by eliminating the disintegrated hull by air separation. The obtained fat-free product is the concentrate containing on average 59.0 percent of protein.

The said methods of obtaining the protein concentrate from the rape seeds feature their common and rather an essential shortcoming, viz. the final product—irrespective of the sophisticated process—still contains the thioglycoside toxic compounds amounting on average to 0.1 percent. Therefore, using this protein concentrate as food or fodder will be coinsideraby limited.

Moreover, with the aforesaid methods used for obtaining the protein concentrate from the rape seeds, water consumptions is pretty high resulting in great amount of effluents and sewages hazordous to natural environment.

On the other hand, the method for obtaining the protein concentrate from the rape seeds according to this invention is free of the above mentioned inconveniences since the whole seeds are cleaned and sorted into at least two fractions, each containing the seeds of unified size, subsequently each fraction being subject to water extraction complete with the mirosinase enzyme inactivation in water of its pH-value 8.0 to 9.5, most preferably 9.0, and the temperature ranging from 90° to 98° C., most advantageously 90° C., during 30–60 minutes, most preferably 30 minutes; then, the seed-leaves become removed from the seeds in their wet condition, the mixturee of hull and seed-leaf washed in hot water, dripped off, and dried. Subsequently, the hull (and the not hulled seeds if any) wil be eliminated, and the cleaned seed-leaves subject to deoiling and disintegration in the conventional manner. The not hulled seeds, as separated before deoiling, become returned to removal of the seed-leaves, and then transferred to further processing thereof. The hulled seeds shall be washed in water 3–10 times (most preferably 3 times) exceeding the weight of seeds, at the temperature of 80° to 98° C., the washing process being carried on during 20 to 40 minutes, most advantageously 30 minutes. The volume of used water and the washing time will be determined by the thioglycoside level in the seeds. On completion of washing, the mixture of seed-leaf and hull shall be dried to the moisture content level from 7 to 15 percent, preferably with dry air preheated to 70°–90° C. Most advantageous has been found such a procedure, where the deoiled concentrate undergoes gradual milling and then it becomes sorted into at least two fractions so as to eliminate from the heaviest fraction the cellulose particles and the hull remainders, if any. On completion of the washing and dripping off process, water shall be cleaned of solid particles, preheated to 90° C.–98° C., alkalifying it to the pH-value level 8.0–9.5, most advantageously to 9.0, by adding the sodium hydroxide, and used again for the seed extraction, whereas the post-extraction wastes shall be subject to biological treatment with conventional agents and methods.

The said method for obtaining the protein concentrate for food or fodder purposes from the rape seeds can be embodied in practice by means of the set of equipment being also covered by this invention. This set of equipment consists of actually conventional facilities arranged according to the required process flow sequence, so that upstream the extractor at least one unit shall be provided for cleaning and sorting of seeds into two fraction as a minimum, each fraction containing the seeds of unified size; moreover, the set comprises preferably the dressing machine (fanner), the trieur, the sieve sorter fo classifying the cleaned seeds into at least two fractions and minimum two storage bins for individual fractions, the bin outlets communicating with the extractor via the cut-off facility (most advantageously the dampers). Downstream the extractor the following facilities shall be provided: the roll huller, the washer for continuous operation, the dripper and the drier, whereas between the drier and the oil squeezer and/or extractor the set is equipped with at least one facility to separate hulls (and the not hulled seeds if any) from the seed pulp, and preferably the sieve-air separator (classifier) with the finest fraction outlet (discharge) directly connected to the units for oil squeezing and/or extraction, whereas the outlets for other fractions are connected to these facilities through several (preferably three) air sorters (classifiers) and three pneumatic table vibrators arranged in parallel and interconnected in pairs. The set of the process equipment contains also the cyclone (dust extractor) complete with the air-lock and the fan, the latter being connected with the dressing machine (fanner) circulating air outlet, and also has the cloth filter complete with the air-lock and the fan, which is associated with the sieve-air sorter (classifier) circulating air outlet, the air classifiers and the pneumatic table vibrators. On the other hand, the not hulled seed outlets from the pneumatic table vibrators are connected to any piece of equipment located upstream the roll huller, preferably to the storage bins for the seeds of particular fractions. The discussed set of equipment comprises also the following facilities connected in series: the water tank complete with its filter, the pump, the heat exchanger, the water tank complete with the agitator and the stub pipe for the sodium hydroxide supply, the said facilities being introduced in the system of water circulating from the washer and the dripper to the extractor. Moreover, downstream the equipment for oil squeezing and/or extraction, there is the protein concentrate bin, and further on, several of the roll-type mills and the sieve sorters connected in series and intended for classifying the milled protein concentrate into at least two fractions, whereby the outlet for the medium-size fraction from the first classifier to the third roller mill and so on, the medium-size fraction outlet from the last classifier being associated with the protein concentrate bin.

The said set of equipment includes also the interconnecting pipework, the metering instruments and the controls.

Due to such a functional association of the above mentioned technical means, available has been the concentrate produced from the rape seeds, with its protein content reaching 60 percent and more, and absolutely free of the thioglycoside-type toxic compounds. It is also advantageous, that the said effects have been attained with lower (than before) use of the process water, no hazard being caused to the natural environment conditions. It has been found during this invention related research work, that the thioglycoside-type toxic compounds, which were impossible to be eliminated hitherto regardless frequent washing in pure water, can be easily removed from the seeds with the mirosinaze enzyme inactivation process being carried on in parallel with the thioglycoside extraction, removal of still remaining thioglycosides being accelerated by washing of individual seed-leaves without destruction of their inner structure. Moreover, with the seed-leaves removed still before washing, hulling in dry condition becomes facilitated, flouring being prevented at a time. This rather unexpected founding, being of basic importance for this invention, essentially—though not exclusively—did contribute to attaining the said advantages as according to the invented process the water after washing and dripping off becomes subject to treatment and returned again to the seed extraction stage, whereas the post-extraction wastes and dusted air are purified in the accompanying process.

When using the method according to this invention, the dry bulk loss does not exceed 13 percent causing no loss to the protein and fat content. Under the production process such compounds become removed from the seeds like: the thiogylocosides, the colouring substances, the non-protein nitrogen and sugars (carbohydrates).

The invention embodiment has been diagramatically presented in the drawing enclosed to show the exemplary set of equipment for processing the protein concentrate from the rape seeds in amount of approx. 0.6 t/h according to the invented method.

As may be seen from the said diagram, the set of equipment comprises the following conventional (as a rule) facilities arranged and interconnected in series according to the process flow sequence: the dressing machine (fanner) 1; the trieur 2; the sieve classifier (sorter) 3 to separate the seeds into two different size fractions; two bins 4 complete with the dampers 5 for storing the particular fraction seeds; the continuously operating worm-type extractor 6, and further on the roller-type huller 7; the washer 8 (also continuously operating); the dripper 9, the air-type drier 10, the sieve-air classifier (sorter) 11 for separating the mixture of hull and seed-leaf into four fractions; the deoiler 12; three air classifiers 13, as well as three pneumatic vibrators 14 being evenly spaced and interconnected in pairs, whereby the finest fraction classifier 11 outlet is directly communicated with the deoiler 12, the outlets from the other three fractions being connected to 12 via the classifiers (sorters) 12 and the vibrating tables 14. Downstream the deoiling equipment 12 the set is equipped with the bin 15 for storing the obtained protein concentrate, two roller mills 16 interconnected in series, and two sorters (classifiers) 17 each for separating the milled protein concentrate into three fractions, the medium-size fraction outlet from the first classifier 17 being connected to the second roller mill 16, and that from the last one 17 to the protein concentrate storage bin 15. Moreover, the discussed set of equipment includes the cyclone (dust extractor) 18 complete with the air-lock 19 and the fan 20, communicating with the fanner (dressing machine) 1 circulating air outlet, and the cloth filter 21 complete with the air-lock 22 and the fan 23 connected to the classifier 11 circulating air outlets, the sorters (classifiers) 13 and the table vibrators 14. The set of equipment comprises also the following facilities: the water tank 24 complete with its filter 25, the pump 26, the heat exchanger 27, the water tank 28 complete with the agitator 29 and the stub pipe 30 to supply the sodium hydroxide, these facilities being included in the circulating water system from the washer 8 and the dripper 9 to the successive extractors 6. Moreover, the set of equipment comprises still the metering instruments and controls, not shown in the diagram for its better clarity. The set equipment interconnecting pipework has been shown in the diagram with solid lines, the processed material flow and that of the workin media being indicated by means of arrows.

EXAMPLE 1

The invented process has been illustrated (but not limited to) by the following example based on operation of the set of equipment being related also to this invention. On starting the drives for all the equipment included within the set in question, and with the working media brought to their conditions as appropriate, the rape seeds amounting to approx. 0.6 t/h will be continuously fed to the dressing machine (fanner) 1 from the hopper not shown in the drawing. Here, the heavy-, fine- and light impurities become removed from the seeds, the dusted circulating air being directed dedusted therein. Subsequently, the seeds are passed through the trieur 2 eliminating the longitudinal foreign particles, e.g. the corn grains, and then conveyed to the sieve classifier 3 to be sorted there into two fractions, each containing the seeds of roughly the same size. This operation is quite important for the whole process since just the unified size of seeds in particular fractions will be conclusive for the degree of hulling all the seeds leaving the roller-type huller 7, this degree being of essential importance as regards the effectiveness of washing out the thioglycoside-type compounds. Therefore, it may appear advisable—as in another example—to use the sieve classifier 3 designed for sorting the seeds into three and more fractions. Subsequently, the graded seeds will be disposed from successive bins 4—in separate flow lines—to the continuously operating worm-type extractor 6. Here, the seeds become subject to extraction with parallel inactivation of the mirosinase enzyme in hot water of about 90° C., alkalified with the sodium hydroxide to the approx. pH-value 9, the water amount three times exceeding that of the seeds; the said extraction process will be continued during about 30 minutes when moving the seeds across the extractor 6. On completion of the extraction process, the seeds are fed to the roller-type huller 7, which according to the particular fraction seed size shall be adjusted tight between the rolls and the moving roller by means of set screws so as to ensure husking only of single seed-leaves from the seeds without causing destruction to the internal structure thereof. Then, the hulled seeds will be washed in clean water of amount three times exceeding that of the seeds, at the temperature of 80° C. during 30 minutes, by means of the continuously operating washer 8. The hulled and washed seeds shall be dewatered in the dripper 9, dried in the air-type drier 10 to the 15 percent moisture content level with the air preheated to 80° C., sorted and deprived of hull and the not hulled seeds in the sieve-air classifier (sorter) 11, the air classifiers 13 and on the pneumatic table vibrators 14, the not hulled seeds being fed from the tables 14 back to the bins 4 for repeated processing, and the dusted circulating air from the classifier 11, the classifiers 13 and the tables 14—to the cloth filter 21 for dedusting. The well cleaned seed-leaves are subject to deoiling in the deoiler 12, the obtained protein concentrate being stored in the storage bin 15. This concentrate will undergo further refining process to eliminate the cellulose particles (mainly consisting of fibrin), and the hull remainders, if any. For this purpose, the product shall be processed in the roller mills 16 and graded in the sorters 17 into three fractions, the first and the heaviest fraction (containing the aforesaid disadvantageous admixtures) to be rejected, the medium-size fraction to be milled again, the third (and the finest) fraction being the concentrate, which contains over 60 percent of proteins.

This concentrate is quite free of noxious and toxic thioglycoside-type matters, whereby the term "quite free of noxious and toxic matters" should be understood to the meaning, that their percentage is too low to be detected by means of any conventional methods and testing techniques.

EXAMPLE 2

The whole rape seeds become deprived of heavy, fine, and light impurities, and then graded into three fractions, each containing the seeds of unified size. Thus graded seeds will be passed over to extraction and inactivation of the mirosinase enzyme in hot water alkalified with sodium hydroxide to the pH-value=8.5, at the temperature of 95° C. during 60 minutes. On completion of the water extraction process, the seed-leaves will be removed from the wet seeds without causing destruction to the internal structure thereof. Subsequently, the hulled seeds shall be washed in pure water of amount ten times exceeding that of the seeds, at the temperature of 90° C. during 40 minutes. When washed, the mixture of seed, leaf and hull undergoes dripping off and drying to the 7% moisture content level with air preheated to 70° C. Then, the dried seeds shall be graded (classified), and deprived of hull and the not hulled seeds. The cleaned seed-leaves become deoiled and disintegrated in conventional way.

The not hulled seeds, as eliminated before deoiling, will be passed again to removing of the seed-leaves and further processing.

The obtained protein concentrate becomes milled and sorted into two fractions, the first (and the heaviest) one, containing the cellulose particles and the hull remainders if any, to be rejested, the second fraction being the desired concentrate containing over 60 percent of proteins.

The washery effluent and the water reclaimed from dripping operation, shall be purified (deprived of slid particles), preheated to the temperature of 90° C., alkalified with sodium hydroxide to the value of pH=9.0, and returned to the extraction process accompanied by inactivation of the mirosinase enzyme, the post-extraction wastes being subject to biological treatment by conventional methods.

EXAMPLE 3

The whole rape seeds become deprived of heavy, fine and light impurities, and then graded into four fractions, each containing the seeds of unified size. Thus graded seeds will be passed over to extraction and inactivation of the mirosinase enzyme in hot water alkalified with sodium hydroxide to the value of pH=9.5, at the temperature of 98° C. during 45 minutes. On completion of the water extraction process, the seed-leaves will be removed from the wet seeds without causing destruction to the internal structure thereof. Subsewunetly, the hulled seeds shall be washed in pure water of amount five times exceeding that of the seeds, at the temperature of 98° C. during 20 minutes. On completion of washing, the mixture of seed-leaf and hull undergoes dripping off and drying to the 10% moisture content level with air preheated to the temperature of 90° C. Then, the dried seeds shall be graded (classified), and deprived of hull and the not hulled seeds. The cleaned seed-leaves become deoiled and disintegrated in conventional way.

The still not hulled seeds, as eliminated before deoiling, will be returned again for removing the seed-leaves and further processing.

The obtained protein concentrate becomes milled and sorted into four fractions: the first being the heaviest one (which contains the cellulose particles and the hull remainders if any) to be rejected, the second and the third ones to be milled again, the fourth fraction being the finest one is the desired concentrate containing over 60 percent of proteins.

The washery efflueant and the water reclaimed from the dripping operation shall be deprived of solid particles, preheated to 98° C., alkalified to the value pf pH=8.5 with sodium hydroxide, and returned to the extraction process accompanied by inactivation of the mirosinase, the post extraction wastes being subject to biological treatment by conventional methods.

The invention is applicable in production of food- or fodder protein concentrate from the rape seeds.

We claim:

1. A method for obtaining a protein concentrate from rape seeds comprising the steps of:
   a. sorting rape seeds into at least two fractions of unified size;
   b. subjecting the seeds to water extraction and inactivation of mirosinase in water of pH 8.0 to 9.5;
   c. removing seed-leaves from the seeds;
   d. washing the seed-leaves and seeds with water in an amount of from about 3 to about 10 times the weight of the seeds;
   e. drying the seed-leaves and seeds to a moisture content of from about 7% to about 15%;
   f. removing hulls from the seeds and separating the seed-leaves and seeds from the hulls;
   g. deoiling the seeds and seed-leaves to form a protein concentrate.

2. The method of claim 1 wherein the seed-leaves and seeds are washed with water in an amount of three times the weight of the seeds.

3. The method of claim 1 wherein the seed-leaves and seeds are washed with water ranging in temperature from about 80° C. to about 98° C.

4. The method of claim 3 wherein the seed-leaves and seeds are washed for a period of time ranging from about twenty minutes to about forty minutes.

5. The method of claim 1 wherein upon completion of deoiling the protein concentrate undergoes gradual milling and sorting into at least two fractions in order to separate the heavier fraction from any remaining cellulose particles and hulls.

6. The method of claim 1 wherein the water extraction and inactivation of mirosinase is effected in water of pH 9.0.

* * * * *